US012281510B2

(12) United States Patent
Andersson (10) Patent No.: US 12,281,510 B2
(45) Date of Patent: Apr. 22, 2025

(54) LOAD CARRIER FOR A VEHICLE (71) Applicant: Thule Sweden AB, Hillerstorp (SE)

(72) Inventor: Tommy Andersson, Skeppshult (SE)

(73) Assignee: Thule Sweden AB, Hillerstorp (SE)

( * ) Notice: Subject to any disclaimer, the term of this patent is extended or adjusted under 35 U.S.C. 154(b) by 364 days.

(21) Appl. No.: 17/425,875

(22) PCT Filed: Feb. 4, 2020

(86) PCT No.: PCT/EP2020/052672
§ 371 (c)(1),
(2) Date: Jul. 26, 2021

(87) PCT Pub. No.: WO2020/161098
PCT Pub. Date: Aug. 13, 2020

(65) Prior Publication Data
US 2022/0176884 A1 Jun. 9, 2022

(30) Foreign Application Priority Data
Feb. 7, 2019 (EP) ..................... 19155999

(51) Int. Cl.
*B60R 9/055* (2006.01)
*E05D 3/18* (2006.01)
*E05F 1/12* (2006.01)

(52) U.S. Cl.
CPC ............... *E05F 1/12* (2013.01); *B60R 9/055* (2013.01); *E05D 3/18* (2013.01); *E05Y 2201/22* (2013.01); *E05Y 2999/00* (2024.05)

(58) Field of Classification Search
CPC .................................................. B60R 9/055
See application file for complete search history.

(56) References Cited

U.S. PATENT DOCUMENTS 5,823,411 A   10/1998   Gronwoldt et al.
9,290,131 B2 *  3/2016   Sautter ................... B60R 9/055
(Continued)

FOREIGN PATENT DOCUMENTS

EP      422678 A  *  4/1991
EP   2017130 A1  *  1/2009
(Continued)

OTHER PUBLICATIONS

International Search Report and Written Opinion of the International Searching Authority in International Application No. PCT/EP2020/052672, mailed Apr. 17, 2020 (9 pages).

*Primary Examiner* — Scott T McNurlen
(74) *Attorney, Agent, or Firm* — Sterne, Kessler, Goldstein & Fox P.L.L.C.

(57) ABSTRACT

The present disclosure relates to a load carrier for a vehicle having a lid and a base connected along at least one edge by at least one hinge. The at least one hinge includes a first connection member and a second connection member. The first connection member is configured to be pivotably connected to the base or lid at a first proximal end, by a first pivotable connection, and the hinge is releasably connected to the base or lid via the first pivotable connection by a lock member. The second connection member is connected to the other one of the base or lid at a second proximal end. The hinge is configured such that when the lid is opened by pivoting the first connection member with respect to the pivot axle, a distance between the first proximal end and the second proximal end increases.

30 Claims, 5 Drawing Sheets (56) References Cited

U.S. PATENT DOCUMENTS

| | | | | |
|---|---|---|---|---|
| 10,465,412 B1* | 11/2019 | Currid | ............... | E04H 15/48 |
| 2007/0164066 A1* | 7/2007 | Jones | ............... | B60R 9/055 |
| | | | | 224/328 |
| 2011/0186608 A1* | 8/2011 | Sautter | ............... | B60R 9/055 |
| | | | | 224/328 |
| 2013/0043287 A1* | 2/2013 | Hubbard | ............... | B60R 9/055 |
| | | | | 224/328 |

FOREIGN PATENT DOCUMENTS

| | | | | |
|---|---|---|---|---|
| FR | 2840571 A1 | * | 12/2003 | |
| JP | 2006027475 A | * | 2/2006 | |
| WO | WO-2011096832 A1 | * | 8/2011 | |

* cited by examiner

LOAD CARRIER FOR A VEHICLE

TECHNICAL FIELD

The present disclosure relates to a load carrier for a vehicle comprising a lid and a base, wherein the lid and the base are connected along at least one edge by at least one hinge.

BACKGROUND OF THE INVENTION

Load carriers comprising a lid and a base are known to be used for vehicles. An example of such a load carrier is a box provided on the roof of the vehicle. The box may e.g. be a ski-box for accommodating skies, snowboards and also other types of luggage.

The box usually comprises a base and a lid provided on top of the base, which lid can be opened and closed. The base and the lid are also generally connected by at least one hinge provided on at least one of the edges therebetween, wherein the hinge is configured such that the lid can be opened with respect to the base along the at least one edge of the box.

The conventional configuration of such a load carrier is that it is openable from one side. However, it has also become more popular to provide load carriers which can be opened from two sides, thereby increasing the load carrier's flexibility. One example of such a load carrier which is openable from two sides may be found in EP0654573B1, which discloses a box, in particular a roof luggage box. The box is provided with hinges on both longitudinal edges thereof, such that the box can be opened from both longitudinal sides of the box. This design provides an increased flexibility in that luggage can be provided into and taken out from both longitudinal sides of the box. Hence, when the box is mounted onto a vehicle roof, a user may load and unload luggage from both sides of the vehicle.

SUMMARY OF THE INVENTION

In view of the above, an object of the present disclosure is to provide an improved load carrier comprising a base and a lid and at least one hinge.

The object is achieved by the subject matter in independent claim 1. Advantageous embodiments may be found in the dependent claims and in the accompanying description and drawings.

According to the disclosure, the object is achieved by a load carrier for a vehicle comprising a lid and a base, the lid and base being connected along at least one edge by at least one hinge, the at least one hinge comprising a first connection member comprising a first proximal end and a first distal end, the first connection member being configured to be pivotably connected to the base or the lid at the first proximal end, by a first pivotable connection, with respect to a pivot axle being substantially parallel to the at least one edge, wherein the hinge is releasably connected to the base or lid via the first pivotable connection by a lock member, such as a lock pin aligned with the pivot axle. The at least one hinge further comprises a second connection member comprising a second proximal end and a second distal end, the second connection member being connected to the other one of the base or lid at the second proximal end and connected to the first distal end at the second distal end, preferably by a second pivotable connection. Furthermore, the hinge is configured such that when the lid is opened by pivoting the first pivotable connection, a distance between the first proximal end and the second proximal end will increase, as seen in a sectional plane being perpendicular to the pivot axle.

By the provision of the load carrier as disclosed herein, an improved load carrier is provided in that the configuration of the hinge(s) enable(s) that a distance between the lid and the base at their connecting edge will increase when the lid is opened. Thereby, a more tight fit between the lid and the base may be provided when the lid is in a closed position with respect to the base. A more tight fit may provide that a gap between the lid and the base may be significantly reduced, or even eliminated. This in turn may provide improved aerodynamic properties of the load carrier, which is beneficial especially in the case when the load carrier is mounted on top of a vehicle roof. In addition, the configuration of having the at least one hinge releasably connected to the base or lid via the first pivotable connection by e.g. a lock pin aligned with the pivot axle, enables the load carrier to be openable from more than one side thereof in an easy way without the use of any cumbersome designs. Hence, the load carrier configuration as disclosed herein has shown to provide an improved hinge connection which is easy to manufacture, provides high flexibility for a user and which enables improved aerodynamic characteristics of the load carrier.

Optionally, the at least one hinge may further comprise a push member, which is preferably connected, such as pivotably connected, to the second connection member, by a third connection, whereby the hinge is configured such that when the lid is opened by pivoting the first connection member with respect to the pivot axle, the push member is arranged to push on the second connection member, thereby increasing the distance between the first proximal end and the second proximal end, as seen in the sectional plane being perpendicular to the pivot axle. The push member has shown to provide an advantageous and reliable mechanical configuration with few components and/or details for increasing the distance between the first proximal end and the second proximal end.

Optionally, the push member may be configured to push on the second connection member by contacting a countersurface of the base or lid when the lid is opened, wherein preferably the countersurface is an inside wall of the base or lid. Thereby, by making use of an already existing surface of either the base or the lid, the at least one hinge may be configured with few components whilst still providing the expected functions in a reliable manner.

Optionally, the push member may be any one of a hook-shaped lever, preferably an L-shaped hook, a telescopic arm, a gas spring or the like.

Optionally, the push member may be pivotably and/or slidably connected to the first connection member. Thereby, the at least one hinge may provide a triangular-shaped configuration, which is compact whilst still providing the expected functions. Still optionally, the push member may be pivotably and slidably connected to the first connection member via a track provided on or in the first connection member, wherein the track is preferably at least one slot provided on or in the first connection member, and wherein preferably the track is from 10 to 30 millimetres (mm) long, such as 15 to 20 mm. Still optionally, the track may comprise a lock position preventing the push member from sliding in the track when the base and the lid are in the closed position, thereby preventing the second pivotable connection from pivoting. The lock position is preferably positioned at one end of the track. Thereby, the lid may be prevented from being accidentally opened when the lid and the base are in a closed position and when no-one is trying to open the load carrier by pivoting the first pivotable connection. Hence, the hinge may be configured such that the second pivotable connection is prevented from pivoting when the base and lid are in a closed position and when the first pivotable connection is not pivoting. Preferably, the second pivotable connection may only be allowed to pivot when the push member contacts the countersurface of the base or the lid.

Optionally, at least one of the first and second connection member may be configured to increase in length when said lid is opened by pivoting said first pivotable connection, such that the distance between said first proximal end and said second proximal end will increase. For example, the length may be increased by configuring at least one of the connection members as a telescopic arm or by any other configuration which provides a possibility to increase and decrease the length.

Optionally, the second proximal end may be offset from an axle intersecting the first proximal end and the first distal end, as seen in the sectional plane being perpendicular to the pivot axle.

Optionally, the hinge may be configured such that upon closure of the lid, by pivoting the first connection member with respect to the pivot axle, the distance between the first proximal end and the second proximal end is arranged to decrease, as seen in the sectional plane being perpendicular to the pivot axle.

Optionally, the second and/or said third connection may be spring loaded such that the first proximal end and the second proximal end strive to return to a closed configuration.

Optionally, the second connection member may be fixedly attached to the base or lid at the second proximal end.

Optionally, the hinge may be connected to the base or lid only at one pivot axle. This has shown to provide an efficient and reliable hinge connection without any cumbersome details and/or additional components.

Optionally, the lid and base may form a receptacle, such as a ski box.

Optionally, the lid may be arranged to enclose a portion of the base when in the closed position.

BRIEF DESCRIPTION OF THE DRAWINGS

With reference to the appended drawings, below follows a more detailed description of embodiments of the disclosure cited as examples.

In the drawings.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise.

DETAILED DESCRIPTION OF PREFERRED EMBODIMENTS

Figure 1A:
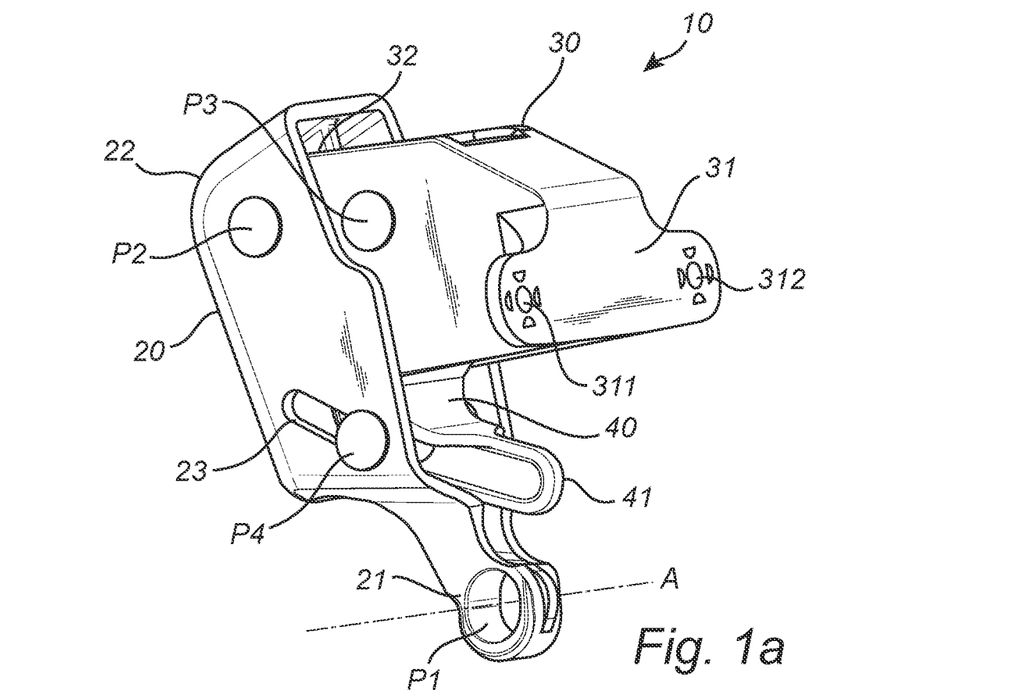
FIGS. 1a and 1b show perspective views of a hinge of a load carrier according to an example embodiment of the present disclosure.
Figure 1B:
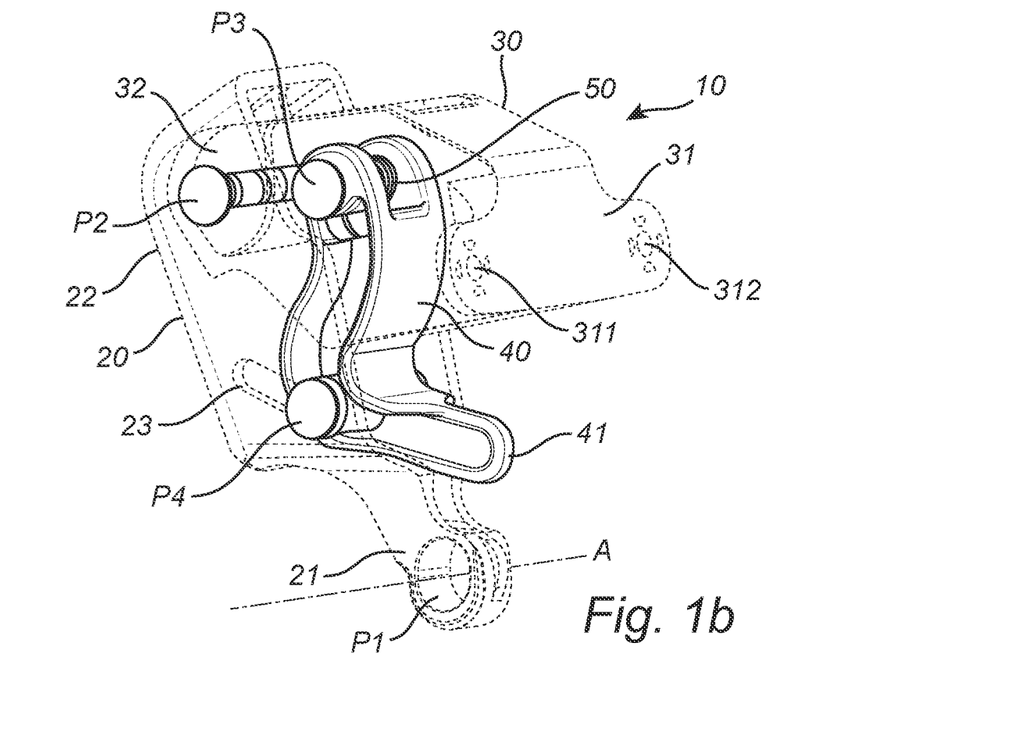
Figure 2A:
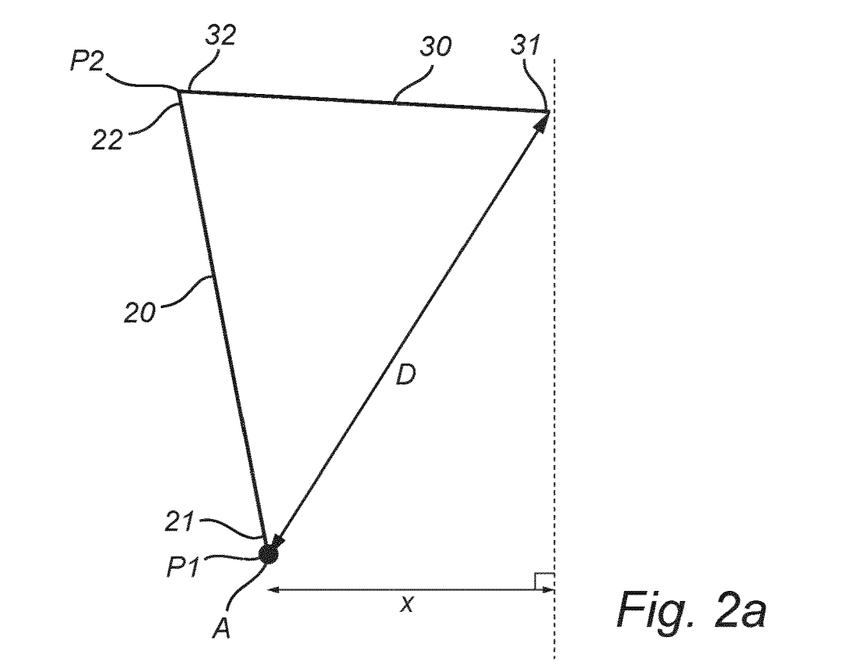
FIGS. 2a to 2d show schematic illustrations of hinges of a load carrier according to example embodiments of the present disclosure.
Figure 2B:
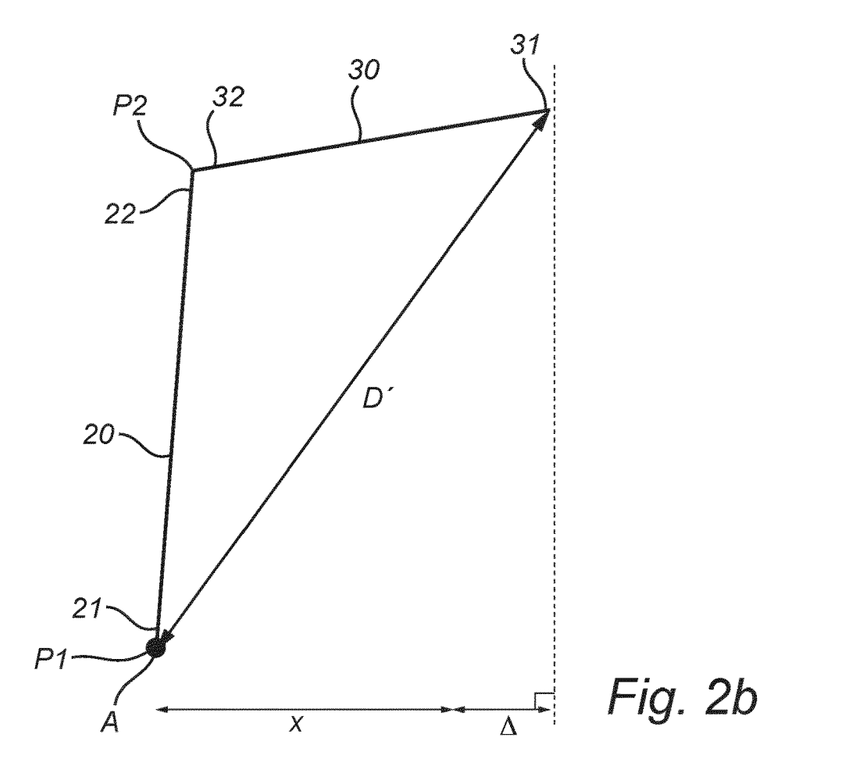
Figure 2C:
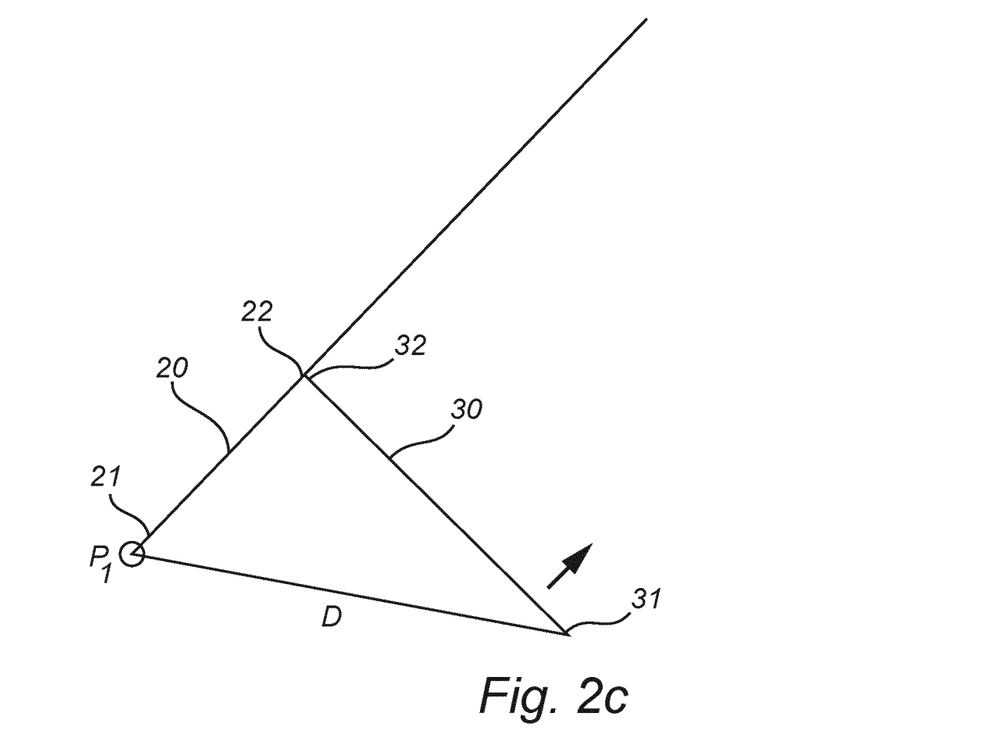
Figure 2D:
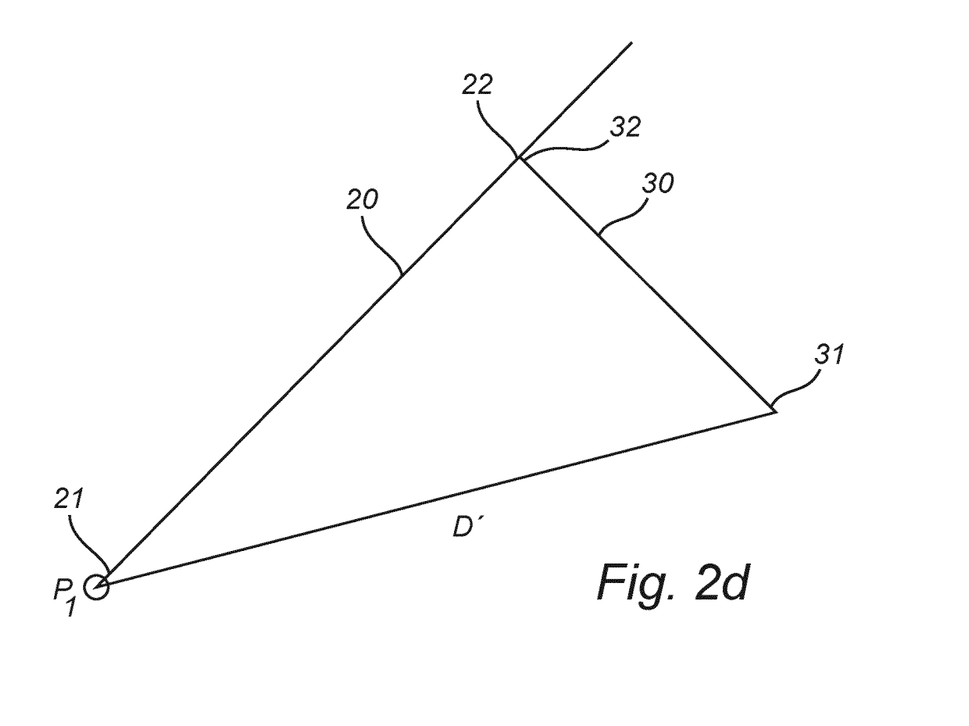
Figure 3A:
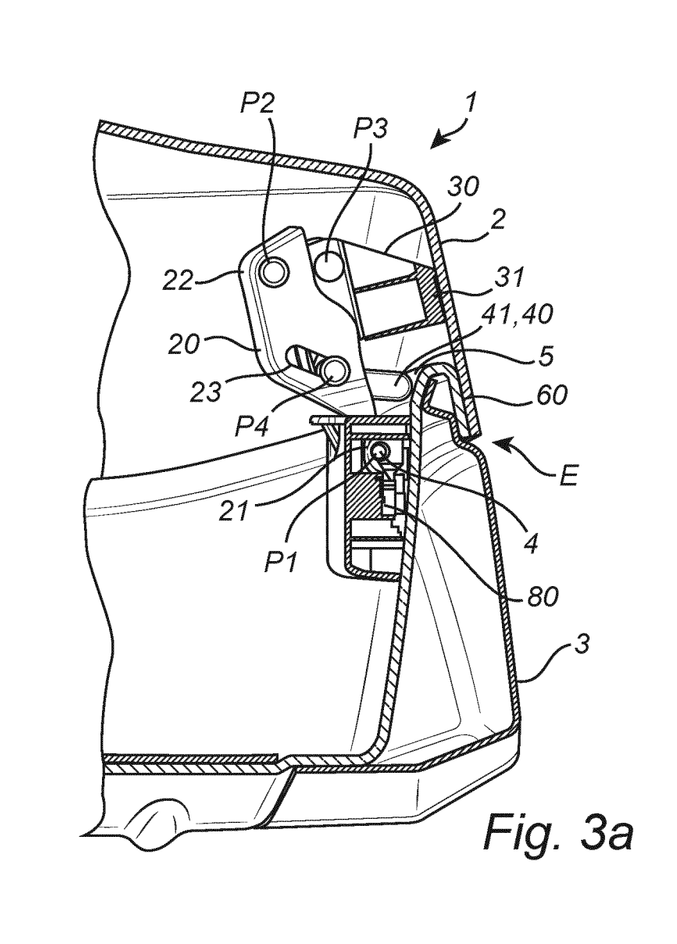
FIGS. 3a and 3b show cross sectional views of a load carrier being in a closed and an open state.
Figure 3B:
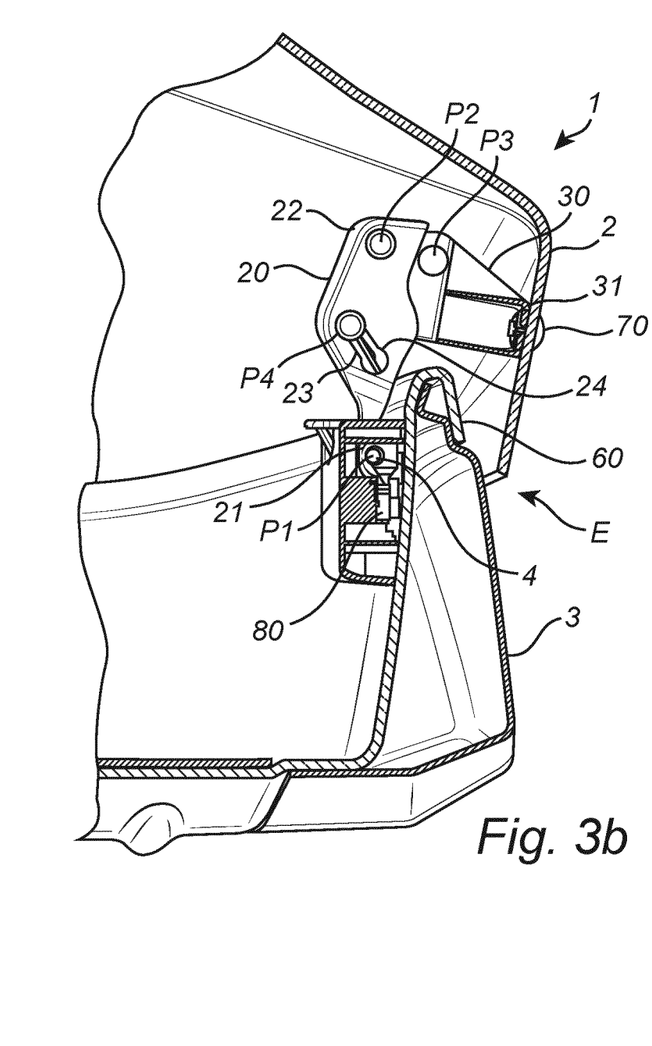
Figure 4A:
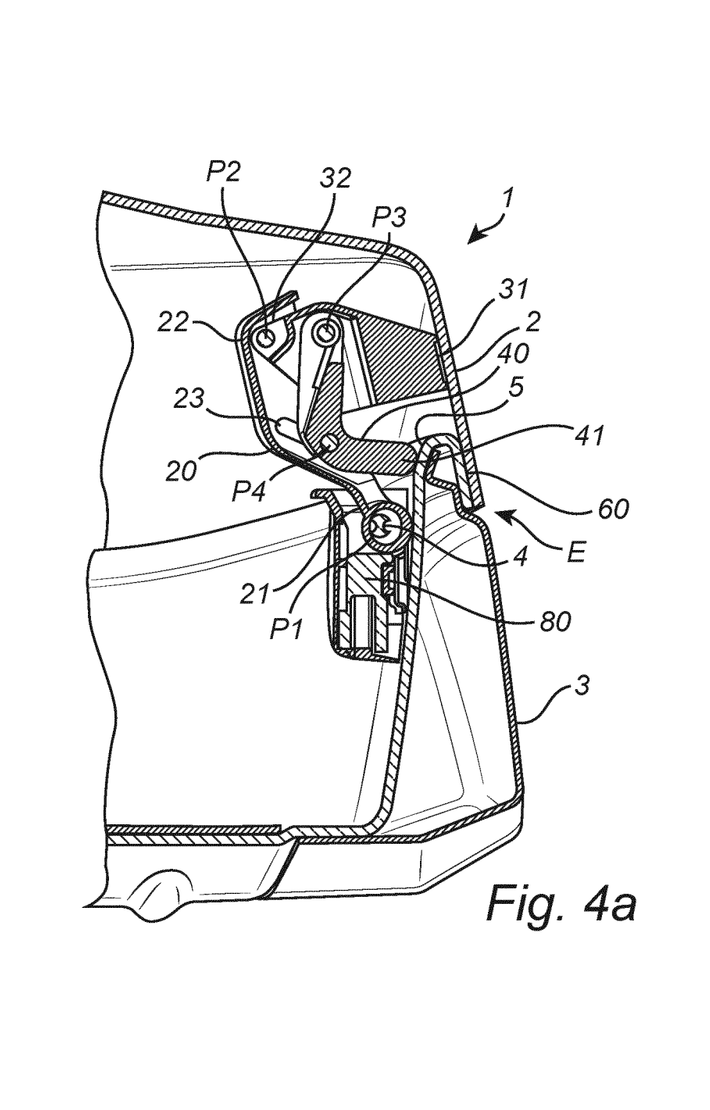
FIGS. 4a and 4b show cross sectional views of a load carrier being in a closed and an open state, wherein also the cross section of a hinge is shown.
Figure 4B:
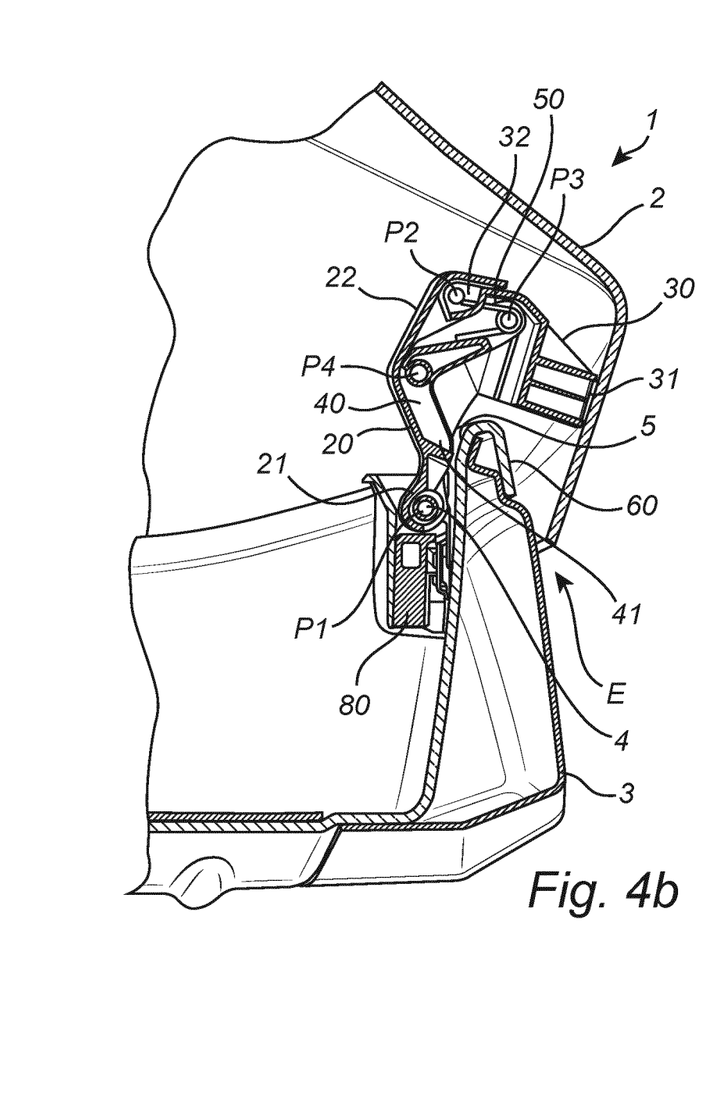

FIGS. 1a and 1b show two perspective views of a hinge 10 according to an example embodiment of the present disclosure, wherein FIG. 1b is a transparent view of the hinge 10 as shown in FIG. 1a. The hinge 10 is part of a load carrier 1 comprising a lid 2 and a base 3, wherein the lid 2 and the base 3 are connected along an edge E, see FIGS. 3a-4b. FIG. 2a shows a schematic view of a hinge 10 when being in a closed position and FIG. 2b shows a corresponding schematic view of the hinge 10 when being in an open position. FIG. 2c shows a schematic view of another hinge 10 when being in a closed position and FIG. 2d shows a corresponding schematic view of the hinge 10 when being in an open position. FIG. 3a shows a cross sectional view of the lid 2 and the base 3 and also a side view of a hinge 10 connecting the lid 2 and the base 3, when being in a closed position, whilst FIG. 3b shows a corresponding view when the lid 2 and the base 3 are in an open position. FIGS. 4a and 4b are similar to the FIGS. 3a and 3b, with the difference that also the hinge 10 is seen in cross section.

The at least one hinge 10 comprises a first connection member 20 comprising a first proximal end 21 and a first distal end 22. The first connection member 20 is configured to be pivotably connected to the base 3 at the first proximal end 21, by a first pivotable connection P1, with respect to a pivot axle A which is substantially parallel to the at least one edge E. According to an embodiment, and as shown in e.g. FIG. 1a, the first connection member 20 may be configured as a housing member which can accommodate other components, which will be further explained hereinbelow. Furthermore, the hinge 10 is releasably connected to the base 3 via the first pivotable connection P1 by a lock pin 4 which is aligned with the pivot axle A, see e.g. FIGS. 3a-4b. The pivotable connection P1 is here provided as a bore where the lock pin 4 can be inserted. In this embodiment, the lock pin 4 is part of a locking mechanism 80 of the load carrier 1 for locking the lid 2 to the base 3. When the lock pin 4 is removed from the pivotable connection P1, the hinge 10 is released from the base 3, and thereby the lid can be opened along the edge E. When the lock pin 4 is in a locked position, i.e. provided inside the pivotable connection P1, the hinge 10 is pivotably connected to the base 3 at the edge E by the first pivotable connection P1. It shall be understood that not only a lock pin may be used, even though it is a simple and effective lock member, but also other types of lock members are possible. For example, the lock member may be a hook. In addition, instead of using a lock pin, an opposite configuration may be possible, where the first pivotable connection P1 of the hinge is configured as a pin and the connection on the base 3 is a bore in which the pin can be inserted. Hence, both male/female and female/male connections are possible, and also includes ball joint connection.

The at least one hinge 10 further comprises a second connection member 30 comprising a second proximal end 31 and a second distal end 32. The second connection member 30 is connected to the lid 2 (see FIGS. 3 and 4) at the second proximal end 31 and pivotably connected to the first distal end 22 at the second distal end 32, by a second pivotable connection P2. The second pivotable connection P2 is preferably arranged to pivot with respect to an axle which is essentially parallel to the pivot axle A. According to an embodiment, and as shown in e.g. FIG. 1a, the second connection member 30 may be configured as a bracket member, which is partly enclosed by the housing member 20.

In the embodiments described in the below, the at least one hinge 10 is mounted between the base 3 and the lid 2 in one orientation. However, it shall be understood that also an opposite orientation of the hinge 10 with respect to the lid 2 and the base 3 is possible. However, it is preferred to mount the hinge 10 such that the first connection member 20 is connected to the base 3 and the second connection member 30 is connected to the lid 2. The first pivotable connection P1 is also preferably located a certain distance below the edge E and/or below the countersurface 5 inside the base 3. The second proximal end 31 is preferably connected to the lid 2 at a position above the edge E inside the lid 2.

The at least one hinge 10 is configured such that when the lid 2 is opened by pivoting the first pivotable connection P1, a distance D, see FIG. 2a, between the first proximal end 21 and the second proximal end 31 will increase to a distance D', see FIG. 2b, as seen in a sectional plane being perpendicular to the pivot axle A. This is preferably accomplished in that the second pivotable connection P2 is pivoted when the lid 2 is opened. It shall however be understood that not only a pivoting motion may be used for providing the increased distance. For example, a translation motion may also be possible, where a length of at least one of the first and second connection member 20, 30, is increased when opening the lid 2 and decreased when closing the lid 2. For example, the first and second connection member 20, 30, may be arc-formed, providing an arc-formed hinge configuration, whereby the length of the arc-form is increased when opening the lid 2 and decreased when closing the lid 2. Either one or even a combination of a pivoting motion and a translation motion may be used for accomplishing the increased/decreased distance when opening/closing the lid 2. A translation motion may for example be accomplished by the use of a telescopic arm. For example, at least one of the first and second connection member 20, 30 may comprise a telescopic arm configured to increase and decrease in length when opening and closing the lid. An example illustration of a translation motion is shown in FIGS. 2c and 2d. Here it can be seen that the first connection member 20 is configured to increase in length when the lid 2 is opened, such that the distance D, FIG. 2c, is increased to the distance D'. For example, the length increase/decrease may be accomplished in that the length between the positions 21 and 22 is increased/decreased, and/or that the length between the positions 31 and 32 is increased/decreased. This may for example be accomplished by having a track on any one of the members 20, 30, in which the other one of the members 30, 20, may slide when opening/closing the lid 2.

In the embodiments shown in the figures, except for FIGS. 2c-d, the length increase/decrease is accomplished by providing a push member 40. The push member 40 is in these embodiments pivotably connected to the second connection member 30, by a third pivotable connection P3. The hinge 10 is configured such that when the lid 2 is opened by pivoting the first pivotable connection P1, the push member 40 is arranged to push on the second connection member 30, thereby increasing the distance D to D' between the first proximal end 21 and the second proximal end 31, as seen in the sectional plane being perpendicular to the pivot axle A. This is achieved in that the push member 40 is configured to push on the second connection member 30 by contacting a countersurface 5 of the base 3 when the lid 2 is opened. In this embodiment, the countersurface 5 is an inside wall of the base 3. The push member 40 is able to contact the countersurface 5 in that the push-member is shaped as an L-shaped hook-member. Of course, also other types of shapes and/or configurations are possible in order to achieve the desired functionality. For example, and as mentioned in the above, the push member may be in the form of a telescopic arm, a gas spring or the like.

In the shown embodiments, an outer end portion 41 of the L-shaped push member 40 is contacting the countersurface 5 when the lid 2 is opened.

Furthermore, in the embodiments shown in the figures comprising the push member 40, the L-shaped push member 40 is mainly enclosed by the housing member 20, thereby providing a compact configuration where also the push member 40 is protected from e.g. the inside of the load carrier 1. Hence, the housing member 20 provides a shield/protection cover which protects inner components of the hinge 10 from the inside of the load carrier 1. The protection has shown to be beneficial for maintaining the functionality of the hinge 10 when in use. For example, it may reduce the risk that luggage, skies etc. comes in contact with the push member 40 during use.

Furthermore, the push member 40 is pivotably and slidably connected to the first connection member 20 via a track 23 provided on the first connection member 20. The slidable and pivotable connection is here denoted as a fourth connection P4. The track 23 is here configured by a slot provided on the first connection member 20. As can be seen, the slot 23 is angled with respect to an axle intersecting the first proximal end 21 and the first distal end 22, when seen in the sectional plane being perpendicular to the pivot axle A. For example, the slot may be angled with respect to the axle intersecting the first proximal end 21 and the first distal end 22 by an angle of 10-70 degrees, such as 15-60 degrees. The angle is angled away from the countersurface 5.

The slot 23 comprises a lock position 24, see FIG. 3b, preventing the push member 40 from sliding in the slot 23 when the base 3 and the lid 2 are in the closed position, thereby preventing the second pivotable connection P2 from pivoting. In this embodiment, the lock position 24 is positioned at an outer end of the slot being proximate the countersurface 5. More particularly, by the lock position 24, the second pivotable connection P2 is prevented from pivoting when the base 3 and the lid 2 are in a closed position and when the first pivotable connection P1 is not pivoting. The lock position 24 is in this embodiment a recess provided in the slot 23. The functioning of the lock position 24 is such that the second pivotable connection P2 is only allowed to pivot when a force is acting on the outer end portion 41 of the L-shaped push member 40 in a direction which is substantially in line with the extension of the slot 23, when seen in the sectional plane being perpendicular to the pivot axle A. The configuration of the L-shaped push member 40 and the countersurface 5 generates such a force component when the L-shaped push member 40 is contacting the countersurface 5 via the push member's outer end portion 41.

Furthermore, the second proximal end 31 is offset from an axle intersecting the first proximal 21 end and the first distal end 22, as seen in the sectional plane being perpendicular to the pivot axle A. This enables improved connection and design freedom of the interface between the lid 2 and the base 3. This is for example shown in FIGS. 2a and 2b, where the second proximal end 31 is offset from the axle intersecting the first proximal end 21 and the first distal end 22.

Moreover, in the embodiments shown in the figures, the third pivotable connection P3 is spring loaded by a spring 50 such that the first proximal end 21 and the second proximal end 31 strive to return to a closed configuration. The spring 50 is preferably a helical torsion spring. More particularly, the fourth connection P4 is by the spring 50 forced to move to the lock position 24 in the slot 23. The force applied by the spring 50 supports the fourth connection P4 to be locked in the lock position 24 when the hinge 10 is in the closed position.

The second connection member 30 is fixedly attached to the lid 2 at the second proximal end 31. The fixed connection between the hinge 10 and the lid 2 is here enabled by rivets 70 which are provided in bores 311 and 312 on the second proximal end 31. The fixed connection may of course be provided by other means, such as by gluing, screws or the like. The second connection member 30 of the hinge 10 may even be provided as an integral part of the lid 2.

In the embodiments shown in the figures, the hinge 10 is connected to the base 3 only at one pivot axle A by the first pivotable connection P1. This has shown to provide a simple and cost-effective hinge configuration.

By the configuration of the at least one hinge 10, the lid 2 can enclose a portion 60 of the base 3 when the base 3 and the lid 2 are in the closed position, see FIGS. 3a and 4a, by a tight fit having a reduced or almost no gap therebetween. This is enabled by the configuration of the hinge 10, which allows the distance between the portion 60 and the lid 2 to increase when opening the lid 2. This configuration of the hinge 10 is especially shown in the schematic illustrations in FIGS. 2a and 2b. Therein it can be seen that an axle intersecting the first proximal end 21 and the second proximal end 31 forms a hypotenuse with a distance D of a right-angled triangle facing outwardly from the load carrier 1, when seen in the sectional plane being perpendicular to the pivot axle A. When opening the lid 2, the distance D of the hypotenuse increases to D', and thereby a distance of the lower side of the triangle will also increase from x to x+Δ.

The lid 2 and the base 3 form a receptacle 1, which in this embodiment is a ski-box. The receptacle 1 is preferably provided with more than one hinge 10 on each longitudinal side thereof, such that the lid 2 can be opened from both sides, thereby increasing the flexibility of the receptacle. For example, the receptacle 1 may be provided with two to four hinges 10 on each side thereof.

The at least one hinge 10 may for example mainly be made of any kind of polymer material, such as for example Polyoximetylen (POM). Moreover, the pivotable and/or slidable connections, P1-P4, are for example provided by pins, preferably made of metal, such as aluminum or stainless steel. The base and/or the lid may for example be made of any kind of polymer material, such as a thermoplastic polymer, for example Acrylonitrile butadiene styrene (ABS) and Polycarbonate (PC).

It is to be understood that the present invention is not limited to the embodiments described above and illustrated in the drawings; rather, the skilled person will recognize that many changes and modifications may be made within the scope of the appended claims.

The invention claimed is:

1. A load carrier for a vehicle comprising:
   a lid; and
   a base, said lid and base being connected along at least one edge by at least one hinge, said at least one hinge comprising:
      a first connection member comprising a first proximal end and a first distal end, said first connection member being configured to be pivotably connected to said base or said lid at said first proximal end, by a first pivotable connection, with respect to a pivot axle being substantially parallel to said at least one edge, wherein said at least one hinge is releasably connected to said base or lid via said first pivotable connection by a lock member, and
      a second connection member comprising a second proximal end and a second distal end, said second connection member being connected to the other one of said base or said lid at said second proximal end and connected to said first distal end at said second distal end via a second connection,
      wherein said first connection member and said second connection member are biased toward a closed configuration, and wherein opening said lid by pivoting said first pivotable connection overcomes said bias, and
      wherein said at least one hinge is configured such that while said lid is opened by pivoting said first pivotable connection, a distance between said first proximal end and said second proximal end increases, as seen in a sectional plane perpendicular to said pivot axle.

2. The load carrier according to claim 1, said at least one hinge further comprising a push member, wherein said at least one hinge is configured such that when said lid is opened by pivoting said first pivotable connection, said push member is arranged to push on said second connection member thereby increasing said distance between said first proximal end and said second proximal end, as seen in said sectional plane perpendicular to said pivot axle.

3. The load carrier according to claim 2, wherein said push member is configured to push on said second connection member by contacting a countersurface of said base or lid when said lid is opened.

4. The load carrier according to claim 2, wherein said push member is one of a hook-shaped lever, a telescopic arm, and a gas spring.

5. The load carrier according to claim 2, wherein said push member is pivotably or slidably connected to said first connection member.

6. The load carrier according to claim 5, wherein said push member is pivotably and slidably connected to said first connection member via a track provided on or in said first connection member.

7. The load carrier according to claim 6, wherein said track is at least one slot provided on or in said first connection member.

8. The load carrier according to claim 6, wherein said second connection is a pivotable connection, and wherein said track comprises a lock position preventing said push member from sliding in said track when said base and said lid are in a closed position, thereby preventing said second connection from pivoting.

9. The load carrier according to claim 8, wherein said lock position is positioned at one end of said track.

10. The load carrier according to claim 1, wherein said second connection is a pivotable connection, and wherein said at least one hinge is configured such that said second connection is prevented from pivoting when said base and lid are in a closed position and when said first pivotable connection is not pivoting.

11. The load carrier according to claim 1, wherein said second proximal end is offset from an axle intersecting said first proximal end and said first distal end, as seen in said sectional plane perpendicular to said pivot axle.

12. The load carrier according to claim 1, wherein said at least one hinge is configured such that upon closure of said lid, by pivoting said first connection member with respect to said pivot axle, said distance between said first proximal end and said second proximal end decreases, as seen in said sectional plane perpendicular to said pivot axle.

13. The load carrier according to claim 1, wherein said at least one hinge is connected to said base or lid only at one pivot axle.

14. The load carrier according to claim 1, wherein said lid and base form a receptacle.

15. The load carrier according to claim 1, wherein said lid is arranged to enclose a portion of said base when in a closed position.

16. The load carrier of claim 1, wherein said second connection member is fixedly connected to the other one of said base or said lid.

17. The load carrier of claim 1, wherein said second connection is a pivotable connection.

18. The load carrier of claim 1, wherein said first connection member and said second connection member remain in said closed configuration upon release of said lock member connecting said first connection member to said base or said lid at said first pivotable connection.

19. A load carrier for a vehicle comprising:
a lid; and
a base, said lid and base being connected along at least one edge by at least one hinge, said at least one hinge comprising:
    a first connection member comprising a first proximal end and a first distal end, said first connection member being configured to be pivotably connected to said base or said lid at said first proximal end, by a first pivotable connection, with respect to a pivot axle being substantially parallel to said at least one edge, wherein said at least one hinge is releasably connected to said base or lid via said first pivotable connection by a lock member, and
    a second connection member comprising a second proximal end and a second distal end, said second connection member being connected to the other one of said base or said lid at said second proximal end and connected to said first distal end at said second distal end via a second connection,
    wherein at least one of said first connection member and said second connection member is configured to increase in length when said lid is opened by pivoting said first pivotable connection, such that the distance between said first proximal end and said second proximal end increases.

20. The load carrier according to claim 19, wherein said at least one of said first connection member and said second connection member is a telescopic arm.

21. A load carrier for a vehicle comprising:
a lid; and
a base, said lid and base being connected along at least one edge by at least one hinge, said at least one hinge comprising:
    a first connection member comprising a first proximal end and a first distal end, said first connection member being configured to be pivotably connected to said base or said lid at said first proximal end, by a first pivotable connection, with respect to a pivot axle being substantially parallel to said at least one edge, wherein said at least one hinge is releasably connected to said base or lid via said first pivotable connection by a lock member, and
    a second connection member comprising a second proximal end and a second distal end, said second connection member being connected to the other one of said base or said lid at said second proximal end and connected to said first distal end at said second distal end via a second connection,
    wherein said second connection or a third connection is spring loaded such that said first proximal end and said second proximal end are configured to return to a closed configuration, and
    wherein said at least one hinge is configured such that while said lid is opened by pivoting said first pivotable connection, a distance between said first proximal end and said second proximal end increases, as seen in a sectional plane perpendicular to said pivot axle.

22. The load carrier according to claim 21, wherein said second connection or said third connection is spring loaded by a torsion spring.

23. A load carrier for a vehicle comprising:
a lid;
a base;
a hinge connecting said lid and said base, said hinge comprising:
    a first connection member comprising a first proximal end and a first distal end, said first connection member being configured to be releasably and pivotably connected to said base or said lid at said first proximal end, by a first pivotable connection, with respect to a pivot axle being substantially parallel to an edge, and
    a second connection member comprising a second proximal end and a second distal end, said second connection member being connected to the other one of said base or said lid at said second proximal end and connected to said first distal end at said second distal end via a second connection; and
a locking mechanism configured to prevent said lid from being opened,
wherein when said lid is opened by pivoting said first pivotable connection, a distance between said first proximal end and said second proximal end increases, as seen in a sectional plane perpendicular to said pivot axle, and
wherein said locking mechanism comprises a lock member configured to connect said base or said lid to said first connection member at said first pivotable connection when said locking mechanism is locked, and to release said base or said lid from said first connection member when said locking mechanism is unlocked,
wherein said lock member comprises a lock pin configured to be inserted into a bore of said first connection member.

24. A load carrier for a vehicle comprising:
a lid;
a base;
a hinge connecting said lid and said base, said hinge comprising:
    a first connection member comprising a first proximal end and a first distal end, said first connection member being configured to be releasably and pivotably connected to said base or said lid at said first proximal end, by a first pivotable connection, with respect to a pivot axle being substantially parallel to an edge, and
    a second connection member comprising a second proximal end and a second distal end, said second connection member being connected to the other one of said base or said lid at said second proximal end and connected to said first distal end at said second distal end via a second connection, wherein said first connection member and said second connection member remain in a closed configuration upon release of said base or said lid from said first connection member; and a locking mechanism configured to prevent said lid from being opened, wherein when said lid is opened by pivoting said first pivotable connection, a distance between said first proximal end and said second proximal end increases, as seen in a sectional plane perpendicular to said pivot axle, and wherein said locking mechanism comprises a lock member configured to connect said base or said lid to said first connection member at said first pivotable connection when said locking mechanism is locked, and to release said base or said lid from said first connection member when said locking mechanism is unlocked.

25. A load carrier for a vehicle comprising:

a lid;

a base;

a hinge connecting said lid and said base, said hinge comprising:

a first connection member comprising a first proximal end and a first distal end, said first connection member being configured to be pivotably connected to said base or said lid at said first proximal end, by a first pivotable connection, with respect to a pivot axle being substantially parallel to an edge, and a second connection member comprising a second proximal end and a second distal end, said second connection member being connected to the other one of said base or said lid at said second proximal end and connected to said first distal end at said second distal end via a second connection; and a push member slidably connected to said first connection member or said second connection member, and pivotably connected to the other of said first connection member and said second connection member, wherein when said lid is opened by pivoting said first pivotable connection, said push member contacts a countersurface of said base or said lid such that said push member pushes on said second connection member, thereby increasing a distance between said first proximal end and said second proximal end, as seen in a sectional plane perpendicular to said pivot axle.

26. The load carrier of claim 25, wherein said push member is slidably connected to said first connection member and pivotably connected to said second connection member.

27. The load carrier according to claim 25, wherein said push member is a lever.

28. The load carrier according to claim 25, wherein said push member is slidably connected to said first connection member or said second connection member via a track disposed on or in said first connection member or said second connection member.

29. The load carrier according to claim 28, wherein said track is at least one slot disposed on or in said first connection member or said second connection member.

30. The load carrier according to claim 28, wherein said second connection is a pivotable connection, and wherein said track comprises a lock position preventing said push member from sliding in said track when said base and said lid are in a closed position, thereby preventing said second connection from pivoting.

* * * * *